(12) United States Patent
Brandt et al.

(10) Patent No.: US 12,223,134 B2
(45) Date of Patent: Feb. 11, 2025

(54) ACCELERATION SENSOR FOR TOUCH DISPLAY SURFACE

(71) Applicant: Harman Becker Automotive Systems GmbH, Karlsbad (DE)

(72) Inventors: Peter Brandt, Pfinztal (DE); Joerg Welke, Ettlingen-Schöllbronn (DE)

(73) Assignee: Harman Becker Automotive Systens GmbH, Karlsbad (DE)

( * ) Notice: Subject to any disclaimer, the term of this patent is extended or adjusted under 35 U.S.C. 154(b) by 0 days.

(21) Appl. No.: 18/533,377

(22) Filed: Dec. 8, 2023

(65) Prior Publication Data

US 2024/0134476 A1   Apr. 25, 2024

Related U.S. Application Data

(63) Continuation of application No. PCT/EP2021/065309, filed on Jun. 8, 2021.

(51) Int. Cl.
   *G06F 3/041*   (2006.01)
(52) U.S. Cl.
   CPC .......... *G06F 3/0416* (2013.01); *G06F 3/0412* (2013.01)
(58) Field of Classification Search
   CPC . G06F 3/01; G06F 3/016; G06F 3/041; G06F 3/0412; G06F 3/0416; G01H 1/00
   See application file for complete search history.

(56) References Cited

U.S. PATENT DOCUMENTS

| | | | |
|---|---|---|---|
| 3,859,847 A | 1/1975 | Ronemus | |
| 11,231,434 B2 * | 1/2022 | Chino | H05K 5/0008 |
| 2014/0152576 A1 * | 6/2014 | Kim | G06F 3/0412 |
| | | | 345/169 |
| 2014/0168173 A1 * | 6/2014 | Idzik | G06F 3/0321 |
| | | | 345/179 |
| 2014/0168175 A1 * | 6/2014 | Mercea | G06F 3/03545 |
| | | | 345/179 |
| 2015/0169080 A1 * | 6/2015 | Choi | G06F 3/0488 |
| | | | 345/184 |
| 2020/0183504 A1 * | 6/2020 | Helmer | G06F 3/0393 |

FOREIGN PATENT DOCUMENTS

DE   102015102238 A1 *   8/2016   .......... G06F 11/2221
JP   2009247885 A   *  10/2009

OTHER PUBLICATIONS

International Search Report issued in corresponding International Application PCT/EP2021/065309, mailed Feb. 22, 2022.

* cited by examiner

*Primary Examiner* — Joe H Cheng
(74) *Attorney, Agent, or Firm* — Burris Law, PLLC

(57) ABSTRACT

A sensor unit including a housing and a contact element movably mounted along a first axis and configured to come into contact with a touch display surface. The contact element is moved along the first axis when coming into contact with the touch display surface. An acceleration sensor is movably mounted in the housing at least along the first axis. A biasing element is located on one side of the acceleration sensor and configured to bias the acceleration sensor in one of two directions along the first axis. The contact element is movably mounted on the other side of the acceleration sensor opposite the biasing element and is coupled to the acceleration sensor to move the acceleration sensor against the bias of the biasing element in the other of the two directions along the first axis when contacting the touch display surface.

20 Claims, 4 Drawing Sheets

ACCELERATION SENSOR FOR TOUCH DISPLAY SURFACE

CROSS-REFERENCE TO RELATED APPLICATIONS

This application is a continuation of International Application No. PCT/EP2021/065309, filed on Jun. 8, 2021. The disclosure of the above application is incorporated herein by reference.

FIELD

The present disclosure relates to a sensor configured to determine an acceleration of a touch display surface and to a system including the touch display and the sensor.

BACKGROUND

The statements in this section merely provide background information related to the present disclosure and may not constitute prior art.

Haptic feedback of control elements such as touch displays or touch pads play an increasingly important role in the development of human machine interfaces. Especially in the automotive environment an intuitive way of using touch displays is needed as the user of the touch display may not even look at the surface he or she is going to touch. Modern automotive displays will provide a haptical feedback when the user is touching a dedicated area of the display surface.

It is possible that the display surface is moved with an actuator in the horizontal and/or vertical direction to provide the feedback in the fingertips of the user.

With the actual technologies, it is difficult to compare and specify the effectiveness of the haptical feedback which depends on the mass of the moving display parts, the actuator forces, the surface deflection and the forces provided by the fingertips from the user touching the display surface. Accordingly, what is needed is a tool to precisely measure the acceleration of a touch display surface which is moved in response to a touch by a finger.

SUMMARY

This section provides a general summary of the disclosure and is not a comprehensive disclosure of its full scope or all of its features.

According to one aspect, a sensor unit is provided that is configured to determine an acceleration of a touch display surface. The sensor includes a housing and a contact element movably mounted along a first axis and configured to come into contact with the touch display surface. The contact element is moved along the first axis when coming into contact with the touch display surface. The sensor unit furthermore includes an acceleration sensor movably mounted in the housing at least along a first direction. The sensor unit furthermore includes a biasing element located on one side of the acceleration sensor and configured to bias the acceleration sensor in one of the two directions along the first axis. The contact element is movably mounted on the other side of the acceleration sensor opposite the biasing element and is coupled to the acceleration sensor to move the acceleration sensor against the bias of the biasing element in the other of the two directions along the first axis when contacting the touch display surface. With this sensor, it is possible to have a precise and standardized tool to measure the acceleration of touch display surfaces with an adjustable counterforce simulating the force of the fingertip.

It is to be understood that the features mentioned above and features yet to be explained below can be used not only in the respective combinations indicated, but also in other combinations or in isolation without departing from the scope of the present application. Features of the above-mentioned aspects and embodiments described below may be combined with each other in other embodiments unless explicitly mentioned otherwise.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
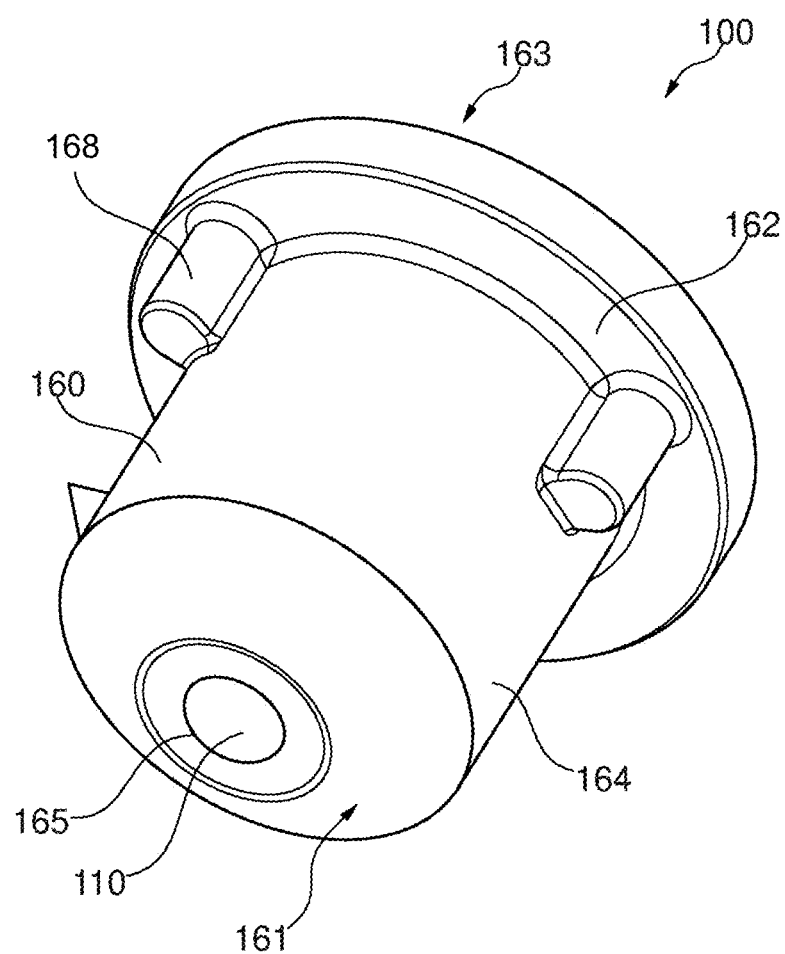
FIG. 1 is a perspective view of a sensor unit configured to determine an acceleration of a touch display surface in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following, embodiments of the present disclosure will be described in detail with reference to the accompanying drawings. It is to be understood that the following description of embodiments is not to be taken in a limiting sense. The scope of the present disclosure is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

FIG. 1 shows a perspective view of a sensor unit 100 which is configured to determine an acceleration of a touch display surface. The sensor unit comprises a housing 160 which is substantially U-shaped with a cylindrical out surface including a bottom or front surface 161 and a rear surface 163. The front surface 161 is the part of the sensor unit which is brought in contact with a touch display surface as will be explained below in connection with FIG. 2.

FIG. 1 also shows a tip portion of a contact element 110. The housing 160 includes a substantial cylindrically shaped portion 164 and a rear portion or flange portion 162 including a flange to which a mounting element of the sensor unit is connected as will be explained in connection with FIG. 2. The flange portion 162 includes protrusions 168 configured to accommodate fixing elements 170 (FIG. 2) which are used to secure a first mounting element 140 shown in FIG. 2 to the housing 160.

Figure 2:
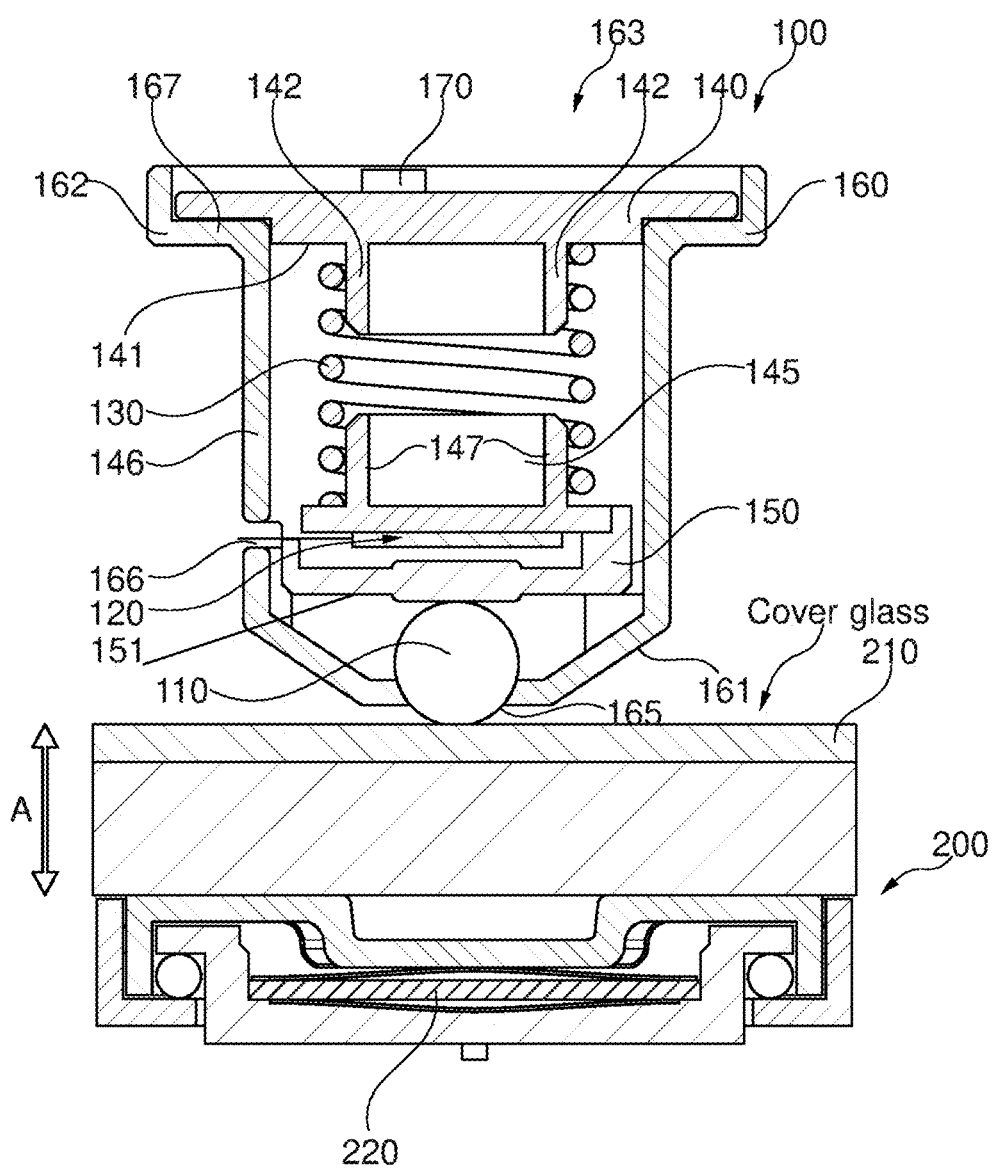
FIG. 2 is a cross-sectional view of the sensor unit of FIG. 1 when measuring the acceleration of a touch display which carries out a vertical surface movement.

Referring to FIG. 2, a cross-sectional view of a system including the sensor unit 100 and a touch display 200 is shown. The sensor unit 100 includes the contact element 110 which is partly accommodated in the housing 160. The housing 160 includes an opening 165 through which a front part or tip part of the contact element 110 protrudes above the front surface 161. A biasing element in the form of a spring 130 is configured to bias the contact element 110 in direction of the opening 165. The spring 130 is arranged between a first mounting element 140 which is fixedly connected to the housing at the flange portion 162 using the fixing elements 170 such as bolts. A first end of the spring 130 is contacting the first mounting element 140 at a first support surface 141. The opposite end of the spring 130 is in contact with a second mounting element 145, wherein the second mounting element 145 includes a second support surface 146. Each of the mounting elements 140 and 145 includes mounting arms 142 and 147, respectively, to keep the spring 130 in place, wherein the mounting arms 142, 147 and the spring 130 extend along a first axis A also shown in FIG. 2.

An acceleration sensor 120 is attached to the second mounting element 145 and is configured to determine the acceleration occurring at the acceleration sensor 120. Furthermore, a support structure 150 is provided which is fixedly connected to the second mounting element 145. The support structure 150 provides a support surface 151 which contacts the rear part of the contact element 110. The acceleration sensor 120 is sandwiched between the second mounting element 145 and the support structure 150. FIG. 2 also shows an opening 166 in the housing 160 provided to transmit the signals of the acceleration sensor 120 to the outside of the sensor unit 100.

In FIG. 2, the sensor unit 100 is shown and used in connection with a touch display 200 including a touch display surface 210 which is touched by a user. The touch display 200 includes a piezo actuator 220 which is configured to move the display surface 210 along the first axis A when the display is touched by a finger. The touch display is configured such that the actuator 220 moves the touch display surface 210 in the direction of the sensor unit, accordingly upwards in the vertical direction in the situation shown in FIG. 2 when the finger contacts the surface. Even when the user is expecting a movement of the touch display surface away from the finger, in the downward direction shown in FIG. 2, the upward movement provides the same haptical feedback and the user has the impression that the display surface is pressed down. The movement is in the range of micrometers, by way of example between 50 and 150 µm, in the range of 100 to 120 µm.

Accordingly, the touch display surface 210 is moved along the axis A when being touched by a finger. Now, when the sensor unit 100 contacts the touch display surface 210 with the contact element 110, the movement along the axis A, here the upward movement in the direction of the approaching finger or sensor unit is translated to the spherical contact element 110. The contact element 110 is made of a material hard enough such as steel, stainless steel that the contact element is not compressed and the movement of the surface 210 is transmitted through the contact element 110, the support structure 150 to the second mounting element 145 where the acceleration sensor 120 is located. Accordingly, the acceleration sensor 120 is moved to the same extent as the contact element 110 and to the same extent as the touch display surface 210.

The spring 130 biases the contact element 110 in direction of the touch display surface to be touched by a sensor unit. The biasing force depends on the spring constant which is used. Depending on the use case the force with which the contact element is pressed in direction of the front surface of the housing, may be between 1 and 10 Newton. This force can simulate the force applied by the fingertip when contacting a touch sensitive surface. In the situation shown in FIG. 2, the touch display 200 moves in a direction perpendicular to the surface 210 of the touch display 200.

The contact element 110 is implemented as a sphere in the embodiment shown. It should be understood that the contact element 110 may be implemented in other shapes such a conical shape or cylindrical shape with a conical tip. The contact element 110 is at least designed such that a tip portion extends through the opening provided at the front surface of the sensor unit 100 and is connected to the support surface 151 at the rear side which moves the acceleration sensor 120 when the contact element 110 is pressed into the interior of the housing 160 when contacting a display surface such as display surface 210. Furthermore the contact element 110 is shaped such at the top portion that the latter is pressed against the opening provided in the housing 160 by the force of the biasing element 130.

Figure 3:
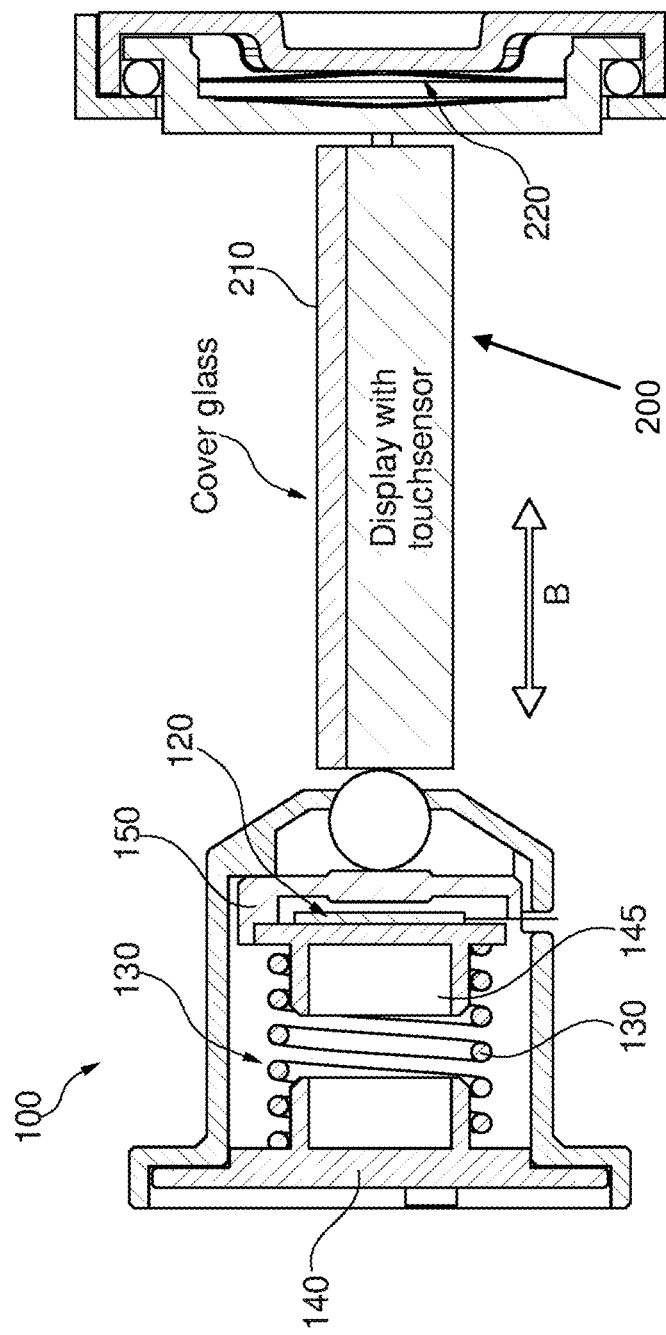
FIG. 3 is another cross-sectional view of the sensor unit of FIG. 1 when measuring the acceleration of a touch display which carries out a horizontal surface movement.

FIG. 3 shows a similar situation, however the actuator 220, in the embodiment shown moves the display 200 with the display surface 210 in a direction parallel to the display surface 210, here a horizontal surface movement, whereas in FIG. 2 the surface movement was a vertical surface movement. When a fingertip or the sensor unit 100 touches the touch display 200, the actuator 220 introduces the horizontal movement as shown by arrow B. The sensor unit 100 is the same sensor as shown in FIG. 2 and is just positioned in a different position compared to the embodiment of FIG. 2, however the functioning is the same so that when the touch display moves along arrow B, the acceleration sensor 120 measures the acceleration occurring at the touch display 200.

The force applied by the sensor unit 100 onto the display surface might be adjustable. This could be obtained by using a biasing element or spring 130 wherein the biasing force of the spring is made adjustable. This could be provided by a control element such as a strain gauge connected to the spring and the housing or any other element having an adjustable height. By way of example the strain gauge could be located between the first mounting element 140 and the end of the spring 130. The end of the spring 130 then contacts the strain gauge instead of the first mounting element. The force determined with the strain gauge is an indicator of the force applied to the display surface.

Figure 4:
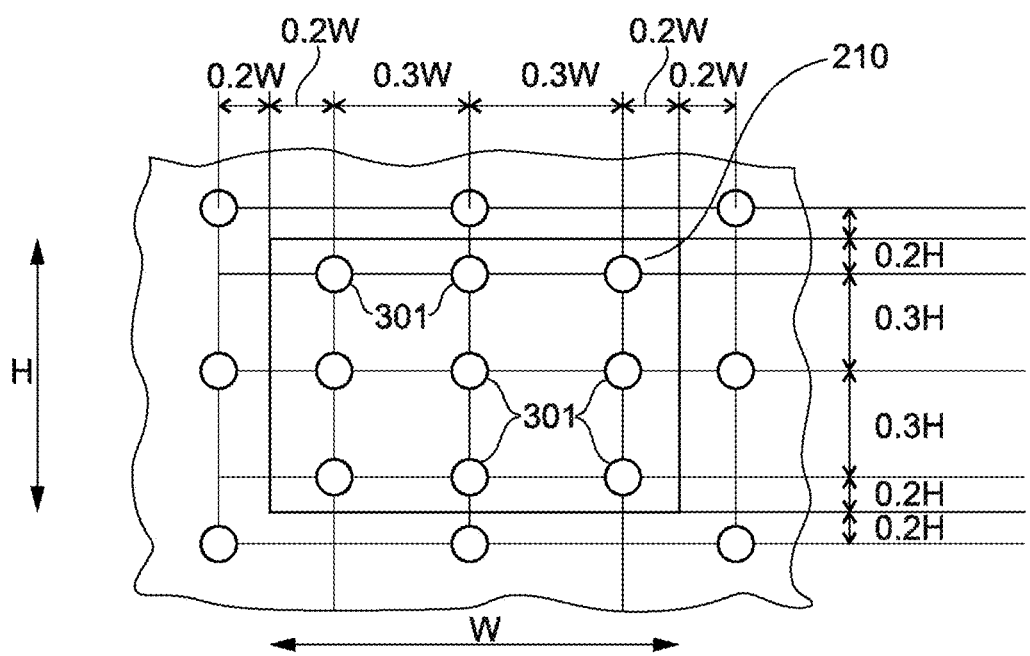
FIG. 4 is a schematic view of measuring points which may be used to determine the acceleration of a touch display surface.

FIG. 4 schematically shows the display surface 210, wherein different measuring points 301 are shown. In the embodiment shown, nine different measuring points are shown which are distributed over the touch display. The nine measuring points 301 are distributed over the surface 210 in dependence on the height H and that width W as shown.

When the acceleration of the display surface is measured at the different points on the surface 210, it is possible to determine whether a uniform movement and acceleration of the display surface is obtained over the complete surface area. The nine points relative to the width W and the height H are known from measuring the brightness of the display. When measuring the display movement at different points, it is possible to find the most cost efficient solution which provides a defined haptical feedback to the user. The sensor unit 100 discussed above can help to obtain a precise and reproducible measurement of the acceleration occurring at the touch of the display.

The sensor unit 100 can include a first mounting element 140 which is fixedly connected to the housing 160, and can include a second mounting element 145 to which the acceleration sensor 120 is coupled. The biasing element or spring 130 is then arranged between the first and the second mounting elements. In one or more embodiments, the counting element is coupled to the second mounting element 145. Accordingly, the second mounting element 145 is movable relative to the housing 160 at least in direction of the axis A and to the first mounting element 140, and the acceleration sensor 120 moves together with the second mounting element 145.

The sensor unit 100 can also include a support structure which is coupled to the second mounting element, such as the support structure 150, and the contact element 110 is coupled to the second mounting element 145 through the support structure 150 and is configured to move the second mounting element 145 together with the support structure 150 when being moved along the first axis A Furthermore, it is possible that the housing 160 includes an opening 165, wherein the biasing element 130 is configured to press the contact element 110 against the opening 165 and a tip portion of the contact element 110 is protruding above the outer surface of the housing 160 in a rest position of the contact element, when the contact element 110 is not contacting the touch display surface 210.

The contact element 110 can have a spherical shape and can be made of a material which is hardly compressible such as stainless steel or any other steel. At least at the force applied in the present disclosure, the contact element 110 can be considered as being not compressible.

The housing 160 may be configured as a U-shaped housing and the first mounting element 140 can be fixedly connected to the housing 160 at one end of the U-shaped housing, and the contact element 110 protrudes above the outer surface of the housing 160 at the opposite end of the U-shaped housing 160 in a rest position of the contact element 110 when the contact element is not contacting the touch display surface 210. It should be understood that the amount of the contact element 110 protruding above the surface is greater or larger than the amount of displacement of the display surface, so that it is possible to measure the complete displacement of the display surface. As the amount of the movement of the display surface is in the range of 100 to 200 μm, this should not be a problem when the contact element protrudes above the outer surface of the housing 160 by several millimeters or centimeters.

The housing 160 includes a fixing surface such as the surface 167 to which the first mounting element 140 is fixedly connected. The fixing surface 167 is provided at the end of the housing 160 at the flange portion where the first mounting element 140 is fixedly connected to the housing 160.

The biasing element 130 can include a preloaded spring, wherein the axial direction of the spring is parallel to the first axis A. The biasing element 130 is configured to bias the contact element 110 in one of the two directions along the first axis A with the force between 0.5 N and 6 N.

As far as the system including the touch display 200 and the sensor unit 100, the touch display 200 can include a piezo actuator which is configured to move the touch display surface 210 in direction of the approaching finger when being touched by the finger. The present disclose provides a sensor unit which is an economic standard tool to compare the performance of displays with haptical feedback.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A sensor unit configured to determine an acceleration of a touch display surface, the sensor unit comprising:
a housing,
a contact element movably mounted along a first axis and configured to come into contact with the touch display surface, wherein the contact element is moved along the first axis when coming into contact with the touch display surface,
an acceleration sensor movably mounted in the housing at least along the first axis,
a biasing element located on one side of the acceleration sensor and configured to bias the acceleration sensor in one of two directions along the first axis, wherein the contact element is movably mounted on the other side of the acceleration sensor opposite the biasing element and is coupled to the acceleration sensor to move the acceleration sensor against the bias of the biasing element in the other of the two directions along the first axis when contacting the touch display surface.

2. The sensor unit of claim 1 further comprising a first mounting element fixedly connected to the housing and a second mounting element to which the acceleration sensor is coupled, wherein the biasing element is arranged between the first and second mounting element.

3. The sensor unit of claim 2, wherein the contact element is coupled to the second mounting element.

4. The sensor unit of claim 2, further comprising a support structure coupled to the second mounting element, wherein the contact element is coupled to the second mounting element through the support structure and is configured to move the second mounting element together with support structure when being moved along the first axis.

5. The sensor unit of claim 2, wherein the housing comprises an opening and the biasing element is configured to press the contact element against the opening, and wherein a tip portion of the contact element is protruding above an outer surface of the housing in a rest position of the contact element when the contact element is not contacting the touch display surface.

6. The sensor unit of claim 2, wherein the contact element has a spherical shape.

7. The sensor unit of claim 2, wherein the contact element is made of steel.

8. The sensor unit of claim 2, wherein the housing is a U-shaped housing, and wherein the first mounting element is fixedly connected to the housing at one end of the U-shaped housing, and the contact element protrudes above an outer surface of the housing at the opposite end of the U-shaped housing in a rest position of the contact element when the contact element is not contacting the touch display surface.

9. The sensor unit of claim 8, wherein the housing comprises a fixing surface at which the first mounting element is fixedly connected to the housing, and wherein the fixing surface is provided at said one end of the U-shaped housing.

10. The sensor unit of claim 2, wherein the biasing element comprises a preloaded spring with an axial direction parallel to the first axis.

11. The sensor unit of claim 2, wherein the biasing element is configured to bias the contact element in the one of the two directions with a force between 0.5 N and 6 N.

12. The sensor unit of claim 2, further comprising a control element configured to adjust a force applied by the biasing element to bias the acceleration sensor in the one of two directions, wherein the control element is connected to the biasing element.

13. A system comprising
a touch display with a touch display surface to be touched by a finger of a user, wherein the touch display surface is configured to be moved in direction of the finger when being touched by the finger, and
the sensor unit claimed in claim 1.

14. The system of claim 13, wherein the touch display comprises an piezo actuator configured to move the touch display surface in direction of the finger when being touched by the finger.

15. The system of claim 13 further comprising a first mounting element fixedly connected to the housing and a second mounting element to which the acceleration sensor is coupled, wherein the biasing element is arranged between the first and second mounting element.

16. The sensor unit of claim 15, wherein the contact element is coupled to the second mounting element.

17. The system of claim 15, further comprising a support structure coupled to the second mounting element, wherein the contact element is coupled to the second mounting element through the support structure and is configured to move the second mounting element together with support structure when being moved along the first axis.

18. The system of claim 15, wherein the housing comprises an opening and the biasing element is configured to press the contact element against the opening, and wherein a tip portion of the contact element is protruding above an outer surface of the housing in a rest position of the contact element when the contact element is not contacting the touch display surface.

19. The system of claim 13, wherein the contact element has a spherical shape.

20. The system of claim 13, wherein the contact element is made of steel.

* * * * *

UNITED STATES PATENT AND TRADEMARK OFFICE
CERTIFICATE OF CORRECTION

| | | Page 1 of 1 |
|---|---|---|
| PATENT NO. | : 12,223,134 B2 | |
| APPLICATION NO. | : 18/533377 | |
| DATED | : February 11, 2025 | |
| INVENTOR(S) | : Peter Brandt et al. | |

It is certified that error appears in the above-identified patent and that said Letters Patent is hereby corrected as shown below:

On the Title Page

Item [73], should appear as follows:
—Harman Becker Automotive Systems GmbH—

Signed and Sealed this
Fifteenth Day of April, 2025

Coke Morgan Stewart
*Acting Director of the United States Patent and Trademark Office*